United States Patent
Noh et al.

(10) Patent No.: US 8,264,993 B2
(45) Date of Patent: Sep. 11, 2012

(54) METHOD FOR MINIMIZING CURRENT CONSUMPTION AT HANDOVER IN MULTIMODE TERMINAL AND TERMINAL FOR USE IN THE SAME

(75) Inventors: Jeong-Min Noh, Seoul (KR); Ho-Joong Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1319 days.

(21) Appl. No.: 11/645,478

(22) Filed: Dec. 26, 2006

(65) Prior Publication Data

US 2007/0147302 A1 Jun. 28, 2007

(30) Foreign Application Priority Data

Dec. 26, 2005 (KR) .......................... 10-2005-129816

(51) Int. Cl.
*H04W 4/00* (2009.01)

(52) U.S. Cl. ... 370/311; 370/324; 370/330; 370/395.62; 370/503; 370/507; 370/905; 455/436; 455/552.1; 455/439; 455/442

(58) Field of Classification Search .................. 370/324, 370/330, 395.62, 503, 507, 905, 331; 455/436, 455/552.1, 439, 442
See application file for complete search history.

(56) References Cited

U.S. PATENT DOCUMENTS

| | | | | |
|---|---|---|---|---|
| 6,112,088 | A | * | 8/2000 | Haartsen ........................ 455/437 |
| 6,438,117 | B1 | * | 8/2002 | Grilli et al. ..................... 370/331 |
| 2002/0147008 | A1 | * | 10/2002 | Kallio ............................ 455/426 |
| 2004/0137903 | A1 | * | 7/2004 | Park .............................. 455/436 |
| 2004/0147262 | A1 | * | 7/2004 | Lescuyer et al. ............... 455/434 |
| 2005/0227691 | A1 | * | 10/2005 | Pecen et al. ................ 455/435.2 |
| 2007/0104142 | A1 | * | 5/2007 | Kim ............................... 370/331 |

FOREIGN PATENT DOCUMENTS

KR 10-2005-0096554 10/2005

OTHER PUBLICATIONS

Korean Intellectual Property Office publication 10-2005-0096554 Oct. 6, 2005.*

* cited by examiner

*Primary Examiner* — Nimesh Patel
(74) *Attorney, Agent, or Firm* — The Farrell Law Firm, P.C.

(57) ABSTRACT

A method and a multimode terminal for minimizing current consumption and simultaneously reducing a handover processing time when a handover occurs between communication networks which provide communication services using different mobile communication technologies. The communication network modems of the multimode terminal are interconnected via a one-to-one communication path, so that a handover target communication network modem is powered on only when handover actually occurs. In this way, by efficiently determining a time point when the handover target communication network modem is powered on, a processing time according to the occurrence of handover can be reduced, and additional current consumption can be minimized.

11 Claims, 6 Drawing Sheets

METHOD FOR MINIMIZING CURRENT CONSUMPTION AT HANDOVER IN MULTIMODE TERMINAL AND TERMINAL FOR USE IN THE SAME

PRIORITY

This application claims priority to an application filed in the Korean Industrial Property Office on Dec. 26, 2005, and assigned Serial No. 2005-129816, the contents of which are incorporated herein by reference.

BACKGROUND OF THE INVENTION

1. Field of the Invention

The present invention generally relates to a handover method in a terminal supporting a multimode, and more particularly to a method for minimizing current consumption when a handover is performed between networks which provide communication services using different mobile communication technologies, and to a terminal for use in such a method.

2. Description of the Related Art

At present time, a mobile communication scheme is evolving from a current $2^{nd}$ generation mobile communication system, such as a Code Division Multiple Access (CDMA) system and a Global System for Mobile Communications (GSM), to a $3^{rd}$ generation network, such as a Wideband Code Division Multiple Access (WCDMA) system. Currently, since the $2^{nd}$ generation mobile communication system is employed in widely distributed service areas, and is completely furnished with infrastructures, the $3^{rd}$ generation network is expanding its territory while transitionally using the infrastructures of the $2^{nd}$ generation network. Therefore, in such a transitional situation, a terminal provided with services specific to the $3^{rd}$ generation network, is being manufactured as a multimode terminal supporting the existing $2^{nd}$ generation system.

An important feature of the multimode terminal is to support an idle handover function, which enables switchover between a WCDMA mode and a CDMA mode in an idle state, and a traffic handover function of switching the terminal's mode to the CDMA mode without interruption when the terminal enters a WCDM shadow area in the middle of a call. These functions are economical in that they take advantage of a CDMA network belonging to the $2^{nd}$ generation system. However it is difficult to internally implement hardware and software in a terminal because the handover should be performed between different modems in a short time.

Operations in a terminal performing an on-call handover between a WCDMA mode and a CDMA mode, will be described with reference to FIG. 1. In order to perform the handover to the CDMA mode in the middle of a WCDMA call, control signals necessary for the handover are transferred in a state where both of the WCDMA and CDMA modems in the terminal operate.

Referring to FIG. 1, if a terminal 100 operates in a WCDMA mode through a WCDMA base station 160 in an overlapping area of a WCDMA network, and enters an area belonging to only a CDMA network, the terminal 100 searches for a CDMA base station because the WCDMA base station 160 is not detected, and then switches its mode to a CDMA mode to complete roaming when the CDMA base station 150 is detected. To the contrary, if the terminal 100 is operating in the CDMA mode when entering the overlapping area, the terminal 100 performs a handover according to predetermined conditions in order to switch its mode to the WCDMA mode again.

Such a dual-mode terminal supporting CDMA and WCDMA modes and using a single antenna is shown in FIG. 2 When the terminal is located in a WCDMA network, a CDMA RF unit 220 and a CDMA modem 240 are temporarily powered off whereas an antenna, a diplexer 210, a WCDMA RF unit 230 and a WCDMA modem 250 are powered on, and thus the terminal operates in the WCDMA mode. In contrast with this, when the terminal is located in a CDMA network, the constituent parts are inversely powered on or off, and thus the terminal operates in the WCDMA mode.

A controller unit 200 corresponds one-to-one to each modem 240, 250 through a switch 260, and one modem is powered off while the other modem operates so as to prevent power consumption. For intercommunication, the modems 240, 250 are connected to each other via an interface 270.

As stated above, the terminal supporting WCDMA and CDMA modes uses two modem chips which supports different mobile communication services according to corresponding modes, respectively. However, if a handover occurs in the middle of a call, the terminal internally powers on the two modems, which result in current consumption one and half times to twice more than that in an idle state.

This process will be described below with reference to FIG. 3. If a call starts in the WCDMA mode, the controller unit 200 transfers a CALL ORIGINATION message to the WCDMA modem 250 in step 300. The WCDMA modem 250 then transfers a CALL SETUP message to the WCDMA base station 160 in step 305. In response to this, the WCDMA base station 160 transfers a CALL CONNECT message to the WCDMA modem 250 in step 310, and the CALL CONNECT message is transferred to the controller unit 200 via the WCDMA modem 250 in step 315.

In step 320, the controller unit 200 establishes a channel for a voice call to perform the call and, in step 325, transfers a CDMA POWER ON message for powering on the CDMA modem 240 to the CDMA modem 240. At this time, since the controller unit 200 communicates with the WCDMA modem 250, in step 330, the CDMA modem 240 does not communicate directly with the controller unit 200, but communicates with the WCDMA modem 250 to transfer a CDMA POWER ON INFORM message informing that the CDMA modem 240 is powered on. Subsequently, in step 335, the CDMA modem 240 receives a GO LOW POWER MODE message from the WCDMA modem 250 and, in step 340, enters a low power mode and waits in an idle state.

In the low power mode, modem parts for processing system acquirement procedures and related protocols do not operate. Nevertheless, if the CDMA modem 240 operates in the low power mode, the terminal consumes an additional current of about 10 to 20 mA. If a handover does not occur and the WCDMA call is completed, the controller unit 200 powers off the CDMA modem 240 to prevent power consumption. If a WCDMA call reopens, the controller unit 200 powers on the CDMA modem 240 and switches the CDMA modem 240 to the low power mode. In this way, the CDMA modem 240 is repeatedly powered on and off.

The reason why the CDMA modem is powered on and is switched to the low power mode for every WCDMA call is that, otherwise a time for switching a one-to-one communication path between the controller unit and the modem from WCDMA to CDMA, and a time during which the controller unit intermediately controls the switching additionally occur. Also, if a time till which the CDMA modem is powered on and initialized, is added to the additional time, the overall handover processing time is lengthened, which may result in failure in the handover. Moreover, since the WCDMA system cannot detect an exact point of time when the terminal performs a handover, it cannot transfer a message, which instructs the terminal to get ready for the handover, at a certain time before the handover occurs.

As stated above, if a WCDMA call starts, a terminal of the prior art inevitably powers on a CDMA modem and operates it in a low power mode in order to get ready for a handover to CDMA. However, if the CDMA modem is powered on whenever a WCDMA call starts, a current used at the time of the WCDMA call increases, and finally the overall power consumption of the terminal increases, which causes a service time of the terminal to be shortened.

SUMMARY OF THE INVENTION

Accordingly, the present invention has been made to solve at least the above-mentioned problems occurring in the prior art, and an object of the present invention is to provide a method for minimizing current consumption in a multimode terminal when a handover is performed between communication networks which provide communication services using different mobile communication technologies, and a terminal for use in such a method.

In order to accomplish this object, in accordance with one aspect of the present invention, there is provided a method for minimizing current consumption in a multimode terminal, which includes first and second modems supporting different communication services, when handover is performed, the method including detecting, by the first modem operating in a first communication mode, a time point of handover according to a signal from a first communication network to transmit a detection result; in response to transmission of the detection result, receiving a Handover from Universal Mobile Telecommunications System Terrestrial Radio Access Network (UTRAN) Command to the first modem in response to transmission of the detection result; and powering on, by the first modem, the second modem through a communication path interconnecting the first and second modems to switch the second modem to a second communication mode in which communication is performed through a second communication network.

In accordance with another aspect of the present invention, there is provided a multimode terminal for minimizing current consumption when handover is performed between different communication networks, the terminal including a first modem for detecting a time point when handover conditions are satisfied to transmit a detection result to a first communication network while operating in a first communication mode, and powering on a second modem through a communication path interconnecting the first and second modems if a Handover from UTRAN Command is received in response to transmission of the detection result; and the second modem for attempting to acquire a second communication network if powered on according to the first modem's instructions, and performing a second communication mode through the acquired second communication network.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
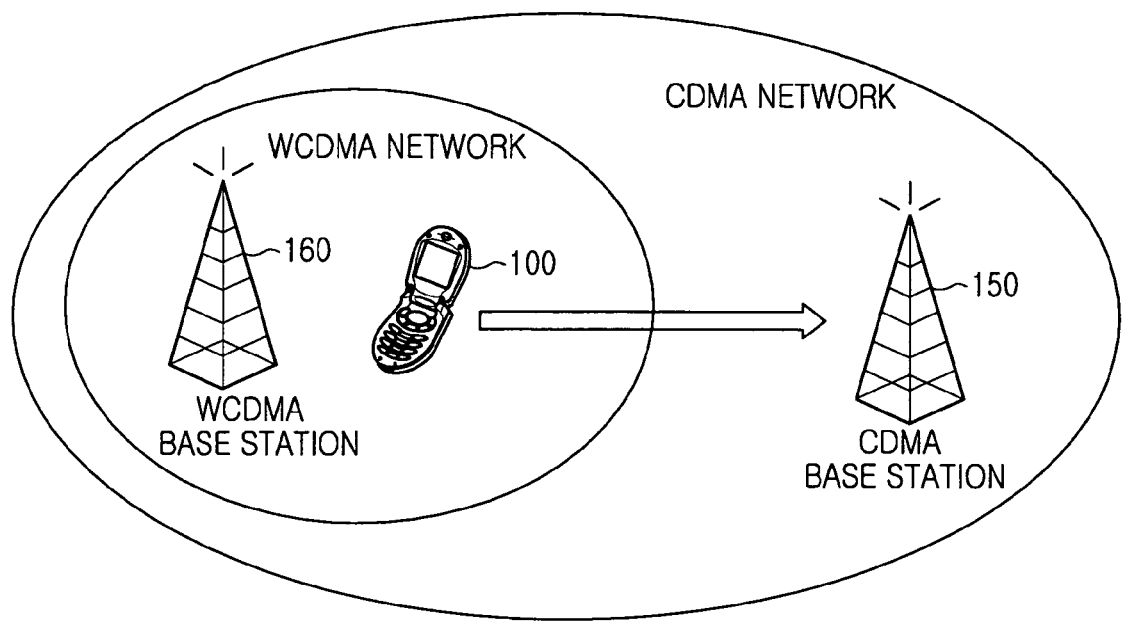
FIG. 1 is a view illustrating an area where common CDMA and WCDMA network systems are implemented.
Figure 2:
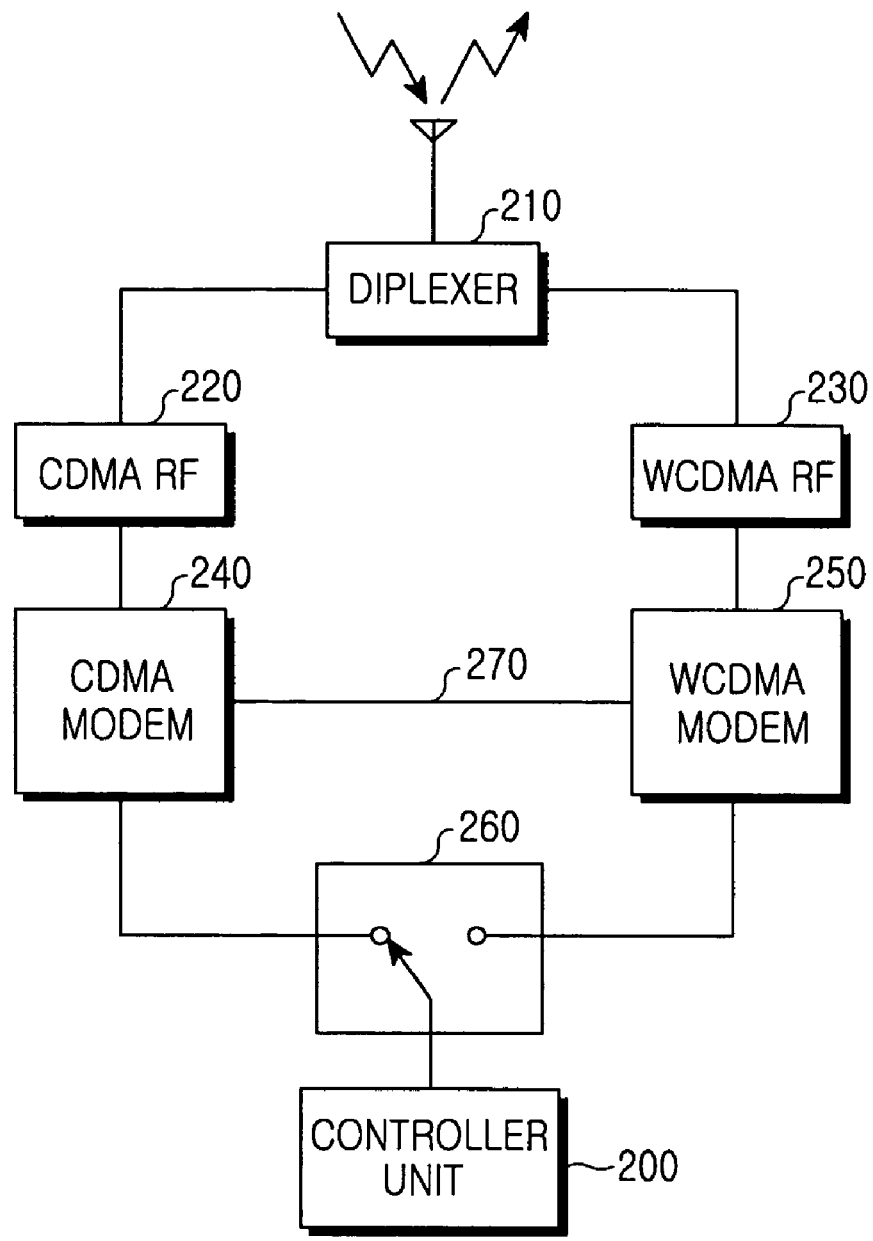
FIG. 2 is a block diagram illustrating an internal structure of a conventional terminal performing a handover.
Figure 3:
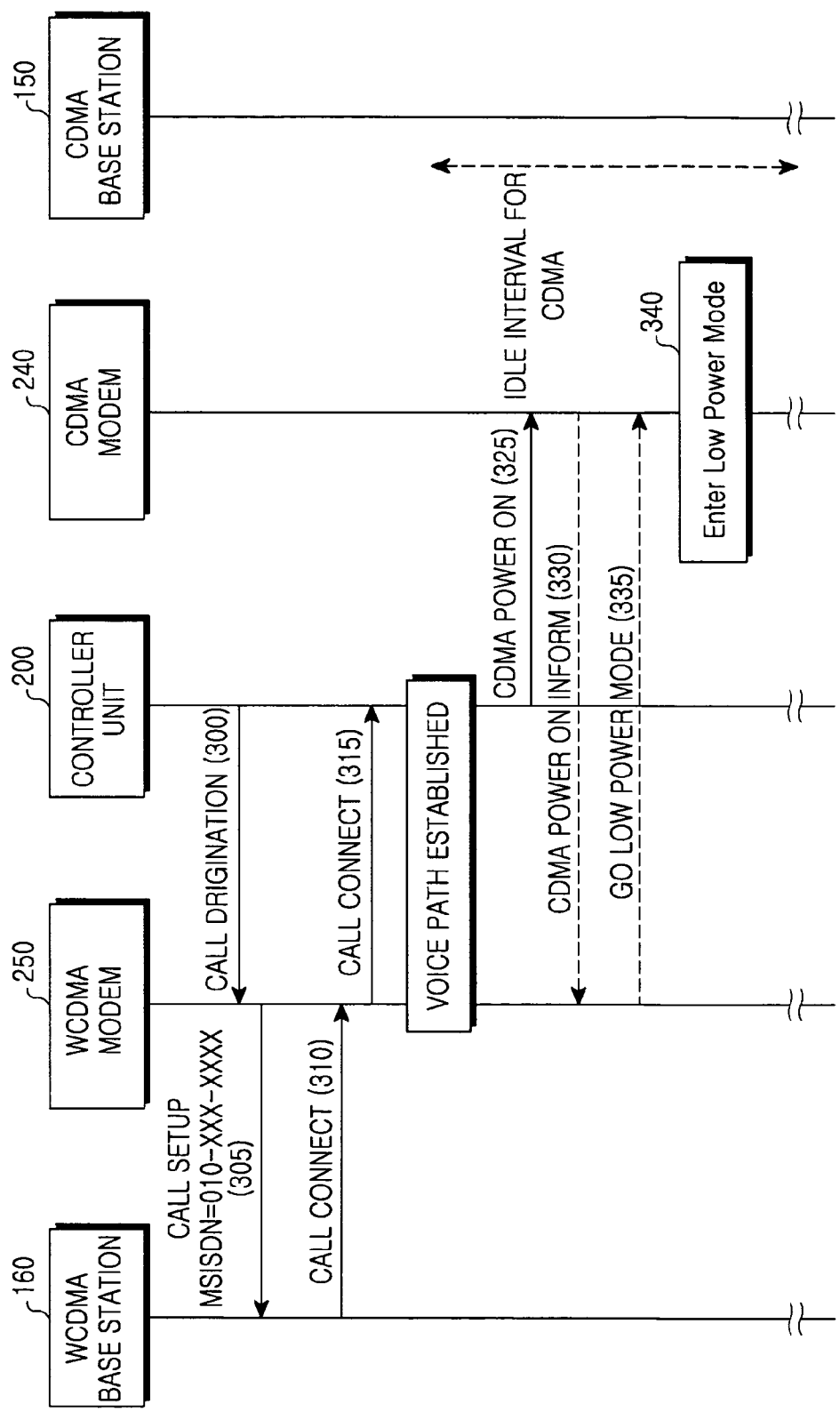
FIG. 3 is a view illustrating operations in a conventional terminal performing handover.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention provides a function of reducing a handover processing time and also minimizing current consumption when a handover occurs between communication networks which provide communication services by using different communication technologies. To this end, in the present invention, each communication network modem of a terminal supporting a multimode is interconnected via a one-to-one communication path, which enables a handover target communication network modem to be powered on when handover actually occurs. According to the present invention, a time point when the handover target communication network modem is powered on is efficiently determined in this way, so that a processing time according to the occurrence of handover can be reduced, and additional current consumption can also be minimized.

Figure 4:
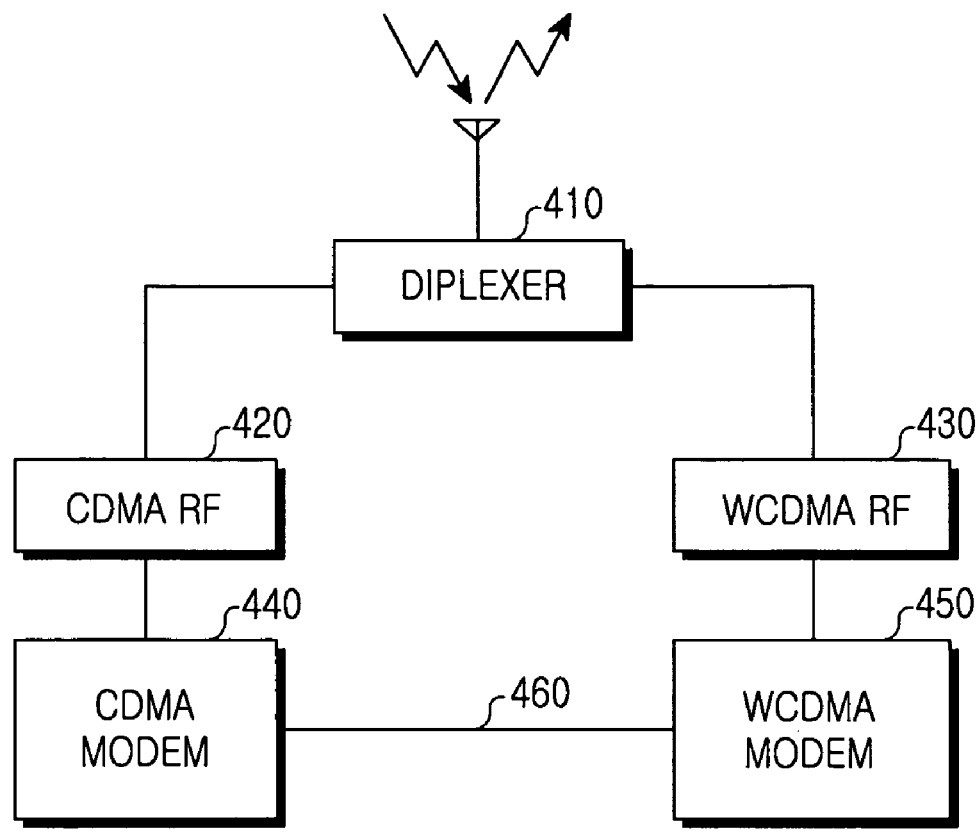
FIG. 4 is a block diagram illustrating an example of an internal structure of a multimode terminal in accordance with the present invention.

FIG. 4 illustrates a multimode terminal using a single antenna in accordance with the present invention. While different mobile communication technologies are exemplified by CDMA and WCDMA in the terminal, it should be noted that CDMA may be substituted by GSM.

The multimode terminal supporting a WCDMA mode and a CDMA mode can include a WCDMA modem 450 and a CDMA modem 440, each of which makes it possible to perform operations according to a corresponding mode. Such respective modems 440, 450 are interconnected through a communication path 460.

The multimode terminal can include an antenna for transmitting/receiving WCDMA and CDMA signals, a diplexer 410 for separating the WCDMA and CDMA signals transmitted/received through an antenna end of the antenna, WCDMA and CDMA RF units 430, 420 for processing the WCDMA and CDMA signals, respectively, and WCDMA and CDMA modems 450, 440 for processing signals transmitted from/received to the WCDMA and CDMA RF units 430, 420 through corresponding processing modules, respectively. The WCDMA modem 450 and the CDMA modem 440 may be a modem chip or may be a DSP within a chip.

When the multimode terminal is located in a WCDMA network, the CDMA RF unit 420 and the CDMA modem 440 are temporarily powered off whereas the antenna, the diplexer 410, the WCDMA RF unit 430 and the WCDMA modem 450 are powered on, and thus the terminal operates in the WCDMA mode. In contrast with this, when the terminal is located in a CDMA network, the constituent parts are inversely powered on or off, and thus the terminal operates in the WCDMA mode. At this time, the WCDMA modem 450 serves as a processor which receives data from the CDMA modem 440 through a communication path 460 to communicate with a user.

Further, in the present invention, the WCDMA modem 450 transfers a Handover from UTRAN Command from a WCDMA base station to the CDMA modem 440 through the communication path 460 between the WCDMA modem 450 and the CDMA modem 440, and provides information for performing handover to the CDMA modem 440. Since the WCDMA modem 450 can transfer instructions directly to the CDMA modem 440 in this way, the multimode terminal need not be provided with a separate application processor, e.g. a controller unit. In other words, the multimode terminal is not provided with a separate controller unit, but each modem 440, 450 is provided with a user interface and a device controller in order to operate in a corresponding mode. Thus, the WCDMA modem 450 and the CDMA modem operate as a master and a slave, respectively. In conclusion, since the WCDMA modem 450 and the CDMA modem 440 are always interconnected via the communication path 460 in the present invention, the terminal need not go through switching procedures between the modems, as a result of which a processing time can be reduced when a handover occurs, and the terminal structure becomes simpler.

Figure 5:
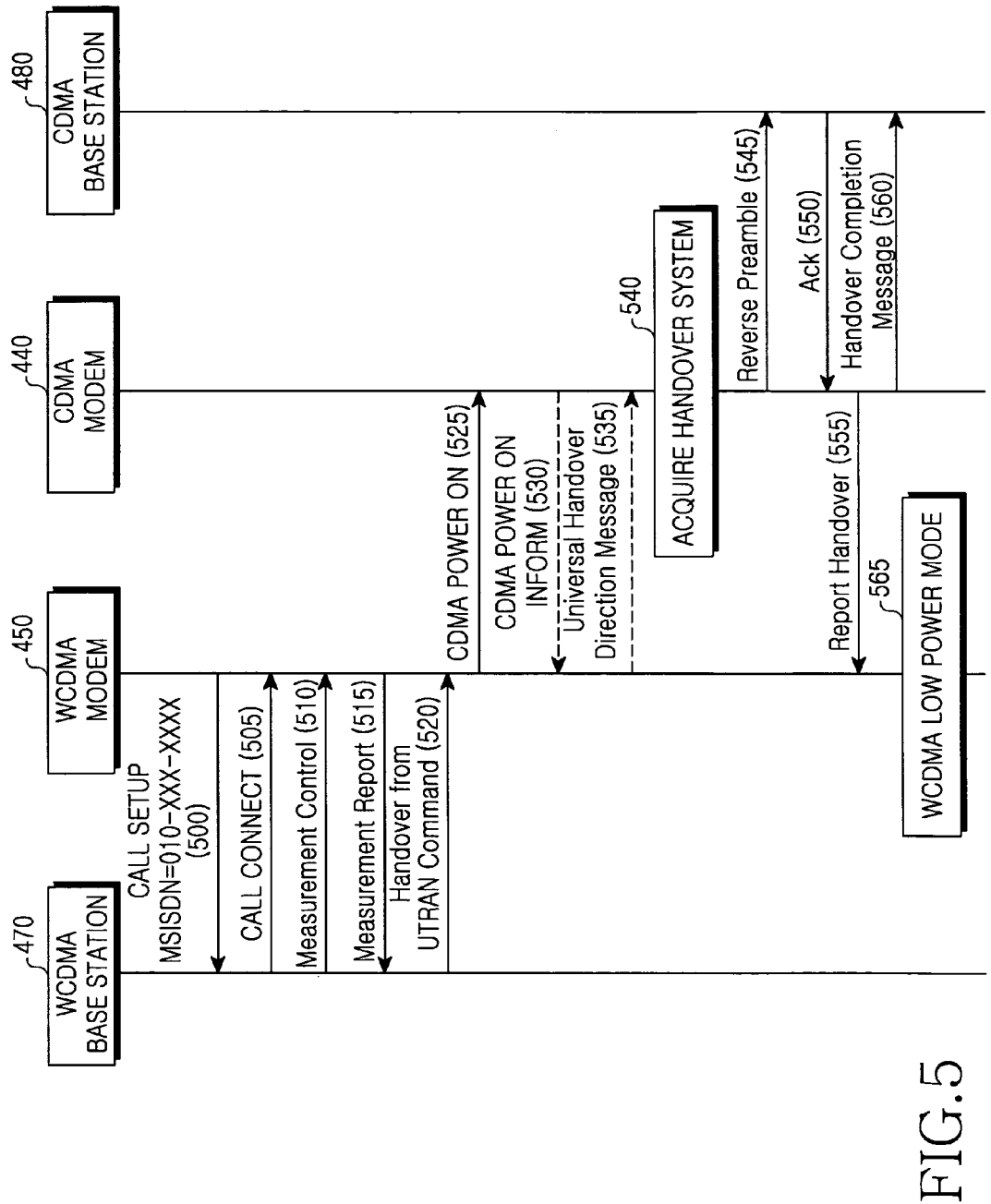
FIG. 5 is a view illustrating message transmission/reception flows which progress between different two modems when handover occurs in accordance with the present invention.

A process of powering on a handover target communication network modem when a handover occurs will be described with reference to FIG. 5. FIG. 5 illustrates message transmission/reception flows which progress between two different modems when handover occurs in accordance with the present invention, and exemplifies a case where a multimode terminal enters from a WCDMA network into a CDMA network.

If a user attempts a call in a WCDMA mode, in step 500, a WCDMA modem 450 transmits a CALL SETUP message including an originating number to a WCDMA base station 470. In response to this, if the WCDMA modem 450 receives a CALL CONNECT message from the WCDMA base station 470 in step 505, it performs the call.

In addition, independently of operations in the WCDMA modem 450, in step 510, the WCDMA base station 470 transmits a Measurement Control message, including a reference value for detecting a time point of the handover, to the WCDMA modem 450. The reference value included in the Measurement Control message is a threshold value which the WCDMA base station 470 specifies in order to determine when a terminal operating in a WCDMA mode performs the handover. The WCDMA modem 450, which has received the Measurement Control message, measures in step 515 whether or not a current radio environment satisfies the reference value. If the current radio environment satisfies the reference value, the WCDMA modem 450 transmits a Measurement Report message to the WCDMA base station 470 in step 515. That is, the WCDMA modem 450 receives the Measurement Control message from the WCDMA base station 470, and continually detects a time point, when the handover conditions are satisfied, according to a command included in the Measurement Control message. The WCDMA modem 450 detects whether or not the strength of a reception signal measured therein satisfies a reference signal strength value included in the Measurement Control message. Through this detection, the WCDMA modem 450 transmits the Measurement Report message to the WCDMA base station 470 when the handover conditions are satisfied.

In the meantime, the WCDMA base station 470 informs a WCDMA switching center of the fact that the handover conditions are satisfied, and the WCDMA switching center communicates with a CDMA switching center to acquire information on a handover target CDMA base station. That is, the WCDMA switching center requests the CDMA switching center to provide information about which CDMA base station the terminal handovers to. By acquiring the information on a corresponding CDMA base station in this way, the WCDMA base station 470 creates a Universal Handover Direction Message (UHDM) configured in a CDMA scheme, and puts this UHDM into one field within a Handover from UTRAN Command message to transmit it to the WCDMA modem 450 in step 520.

If the WCDMA modem 450 receives the Handover from UTRAN Command from the WCDMA base station 470 in step 520, it recognizes that handover actually occurs, and only then transfers a CDMA POWER ON message for powering on the CDMA modem 440 to the CDMA 440 through the communication path 460. In the present invention, since the WCDMA modem 450 and the CDMA modem 440 are always interconnected via the one-to-one communication path 460, switching procedures between the modems 440, 450 are omitted, so that handover processing procedures and thus a handover processing time can be reduced.

In response to this, if the WCDMA modem 450 receives a CDMA POWER ON INFORM message, which informs the WCDMA modem 450 that the CDMA modem 440 is powered on, from the CDMA modem 440, the WCDMA modem 450 extracts the UHDM from the Handover from UTRAN Command received from the WCDMA base station 470, and converts the extracted UHDM into a format recognizable by the CDMA modem 440. The WCDMA modem 450 then transfers the converted UHDM to the CDMA modem 440 in step 535.

In step 540, the CDMA modem 440 attempts to acquire a handover system, that is, a handover target CDMA network according to the transferred UHDM. If the handover target CDMA network is acquired, the CDMA modem 440 transfers a Reverse Preamble message for communication initialization to a CDMA base station 480 in step 545 and, in response to this, receives an ACK message from the CDMA base station 480 in step 540. The CDMA modem 440 then recognizes that it is ready for communication with the CDMA base station 480, transmits a Report Handover message to the WCDMA modem 450, and transmits a Handover Completion message, which indicates successful handover, to the CDMA base station 480 in step 555. At this time, upon receiving the Report Handover message, the WCDMA modem 450 is switched to a WCDMA low power mode.

Since the CDMA modem is powered off in an area where switchover to CDMA is not required, and is powered on to be switched to the CDMA mode only when handover to CDMA actually occurs, additional current consumption occurring at handover can be minimized.

According to the present invention, there is no need for going through overlapping procedures in which after the CDMA modem 440 is powered on, it acquires first a corresponding system in the low power mode and then must reacquire a handover target CDMA system later based on the UHDM. In other words, the CDMA modem 440 is powered on to acquire a corresponding system based on the UHDM immediately when the Handover from UTRAN Command is received. Thus, the overlapping procedures for system acquirement can be omitted.

Figure 6:
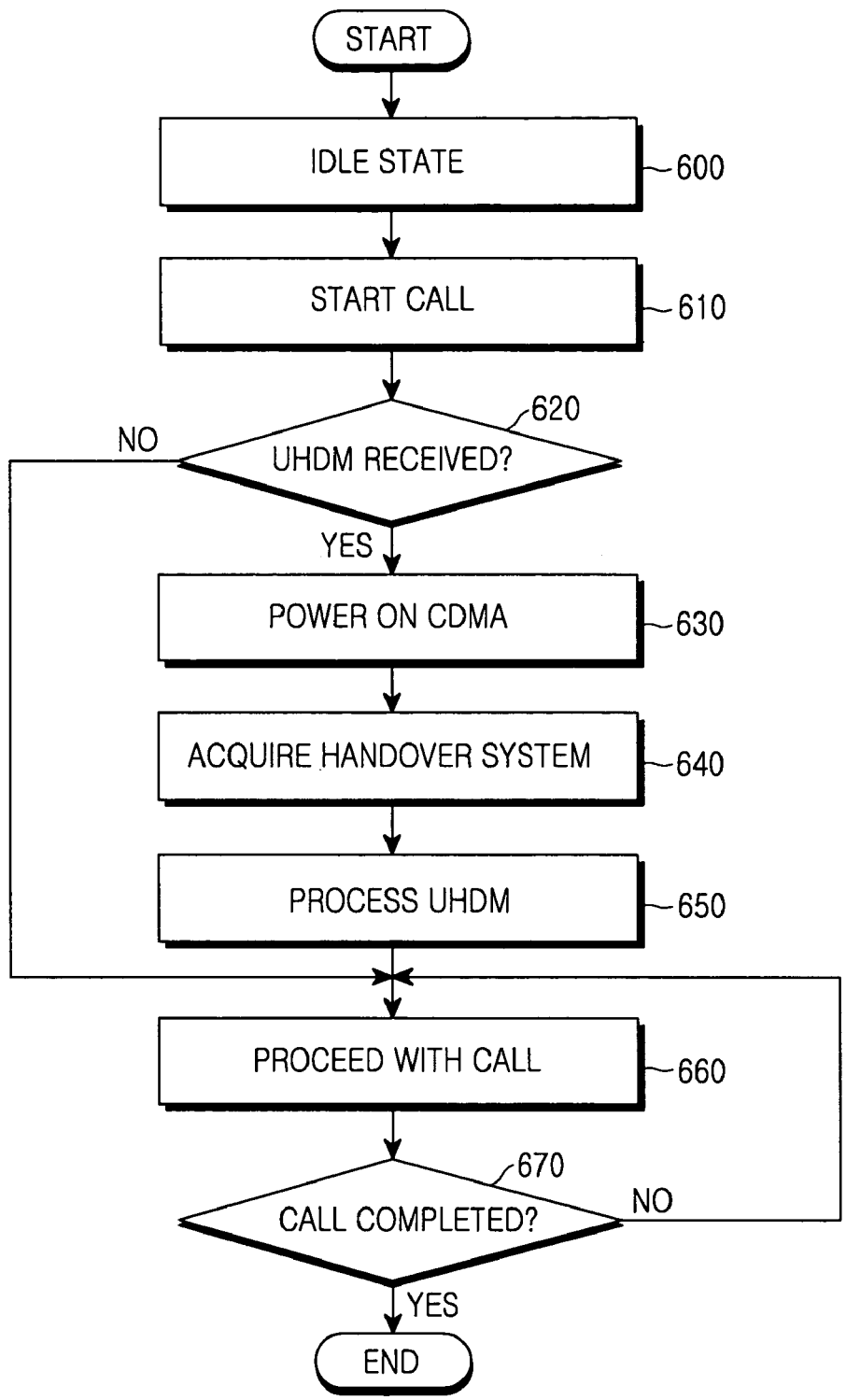
FIG. 6 is a control flowchart in a multimode terminal which performs handover in accordance with the present invention.

With reference to FIG. 5, a description will be given of a control flow for determining a time point when a handover target modem is powered on in a multimode terminal to which the present invention is applied. FIG. 6 illustrates a control flowchart in a multimode terminal which performs handover in accordance with the present invention.

First, a terminal, which is in a WCDMA mode, waits in an idle state in step 600. If a user attempts a call, the terminal starts to perform the call after passing through call connection procedures in step 610. While performing the call, the terminal detects in step 620 whether or not a UHDM is received from a WCDMA base station to a WCDMA modem 450. That is, when the terminal, which is performing the call in the WCDMA mode, enters a boundary area between a WCDMA network and a CDMA network, it receives a Handover from UTRAN Command including a UHDM from a WCDMA base station.

When receiving the handover from UTRAN Command including the UHDM, the terminal powers on a CDMA modem 440 in step 630. In other words, a WCDMA modem 450 transfers a power-on command to the CDMA modem 440 through a one-to-one communication path 460. Subsequently, the terminal acquires a handover system in step 640, and goes to step 650 to process a UHDM, which is extracted and transmitted by the WCDMA modem 450, and converts the processed UHDM into a traffic state. The terminal then proceeds with the call in a CDMA mode in step 660 so the call is completed in step 670. That is, the CDMA modem 440 proceeds with the call in the CDMA mode by acquiring the CDMA handover system.

According to the present invention as described above, when a handover is performed in a multimode terminal supporting the WCDMA and CDMA, a CDMA modem is not powered on every time a call starts, but is powered on to be switched to CDMA only if a handover to CDMA actually occurs. Thus, additional current consumption occurring at handover can be minimized, and the multimode terminal can operate in a stable manner because the number of times of powering on the CDMA modem is significantly reduced.

While the invention has been shown and described with reference to certain preferred embodiments thereof, it will be understood by those skilled in the art that various changes in form and details may be made therein without departing from the spirit and scope of the invention as defined by the appended claims and equivalents thereof.

What is claimed is:

1. A method for minimizing current consumption in a multimode terminal, which includes first and second modems supporting different communication services, when a handover is performed, the method comprising:
    detecting, by the first modem operating in a first communication mode, a time point of the handover according to at least one handover condition from a first communication network and then transmitting a detection result to the first communication network;
    receiving, by the first modem, a handover command from the first communication network in response to transmission of the detection result; and
    transmitting, by the first modem, a power-on command to the second modem through a direct communication path interconnecting the first and second modems to switch the second modem to a second communication mode in which communication is performed through a second communication network.

2. The method as claimed in claim 1, wherein the first and second networks correspond to a Code Division Multiple Access (CDMA) network and a Wideband CDMA (WCDMA) network, respectively, the first and second communication modes correspond to a CDMA mode and a WCDMA mode, respectively, and the first and second modems are modems for processing signals transmitted/received through the CDMA and WCDMA networks, respectively.

3. The method as claimed in claim 1, wherein the first and second networks correspond to a Global System for Mobile Communication (GSM) network and a Wideband Code Division Multiple Access (WCDMA) network, respectively, the first and second communication modes correspond to a GSM mode and a WCDMA mode, respectively, and the first and second modems are modems for processing signals transmitted/received through the GSM and WCDMA networks, respectively.

4. The method as claimed in claim 1, further comprising:
    receiving a Measurement Control signal including the handover condition from the first communication network by the first modem operating in the first communication mode; and
    detecting the time point when the handover condition is satisfied.

5. The method as claimed in claim 4, wherein in the step of detecting the time point, it is detected whether or not strength of a reception signal measured in the first modem satisfies a reference value which the first communication network specifies in order to determine the time point of the handover of the terminal communicating through the first modem.

6. The method as claimed in claim 1, further comprising:
    analyzing the handover command in the first modem if the second modem is powered on;
    extracting a Universal Handover Direction message based on analysis of the handover command; and
    transferring the extracted Universal Handover Direction message to the second modem through the direct communication path.

7. A multimode terminal for minimizing current consumption when handover is performed between different communication networks, the terminal comprising:
    a first modem for detecting a time point when at least one handover condition from a first communication network is satisfied and transmitting a detection result to the first communication network while operating in a first communication mode, and transmitting a power-on command to a second modem through a direct communication path interconnecting the first and second modems if a handover command received in response to transmission of the detection result; and
    the second modem for attempting to acquire a second communication network if powered on according to the first modem's power-on command, and performing a second communication mode through the acquired second communication network.

8. The terminal as claimed in claim 7, wherein the first and second networks correspond to a Code Division Multiple Access (CDMA) network and a Wideband CDMA (WCDMA) network, respectively, the first and second communication modes correspond to a CDMA mode and a WCDMA mode, respectively, and the first and second modems are modems for processing signals transmitted/received through the CDMA and WCDMA networks, respectively.

9. The terminal as claimed in claim 7, wherein the first and second networks correspond to a Global System for Mobile Communication (GSM) network and a Wideband Code Division Multiple Access (WCDMA) network, respectively, the first and second communication modes correspond to a GSM mode and a WCDMA mode, respectively, and the first and second modems are modems for processing signals transmitted/received through the GSM and WCDMA networks, respectively.

10. The terminal as claimed in claim 7, wherein the first modem detects the time point when the handover condition is satisfied based on a Measurement Control signal received from the first communication network while operating in the first communication mode, and transmits the detection result to the first communication network.

11. The terminal as claimed in claim 7, wherein if the second modem is recognized as being powered on, the first modem analyzes the handover command to extract a Universal Handover Direction message, and transfers the extracted Universal handover Direction message to the second modem so that the second modem can acquire the second communication network.

* * * * *